United States Patent [19]

Gay

[11] 4,408,222
[45] Oct. 4, 1983

[54] PHASE DETECTOR FOR TELEVISION TUNING SYSTEMS AND THE LIKE

[75] Inventor: Michael J. Gay, Geneva, Switzerland

[73] Assignee: Motorola, Inc., Schaumburg, Ill.

[21] Appl. No.: 148,348

[22] Filed: May 9, 1980

[51] Int. Cl.³ .............................................. H04N 5/44
[52] U.S. Cl. ...................................... 358/24; 358/17; 358/18
[58] Field of Search ...................... 358/17, 18, 29, 24, 358/23; 329/110

[56] References Cited

U.S. PATENT DOCUMENTS

| | | | |
|---|---|---|---|
| 3,553,357 | 1/1971 | Carnt | 358/18 |
| 3,955,107 | 5/1976 | Okabe | 358/18 |
| 4,072,983 | 2/1978 | Aschwanden | 358/18 |
| 4,340,904 | 7/1982 | Wingrove, Jr. | 358/29 |
| 4,357,623 | 11/1982 | Hinn | 358/18 |

OTHER PUBLICATIONS

Current Mirror Amplifiers Having Current Gains Less Influenced by the Base Currents of Component Transistors, Radovsky, RCA Tech. Notes TN No. 949, 12-3-1-73.

*Primary Examiner*—Michael A. Masinick
*Attorney, Agent, or Firm*—Michael D. Bingham

[57] ABSTRACT

A phase detector suitable for use in an identification circuitry of a PAL/SECAM Television Receiver or the like for identifying the line sequence, wherein the input of the phase detector is adapted to receive the differential output signals from a frequency discriminator. The phase detector includes a differential amplifier stage adapted to receive the output from the frequency discriminator, a multiplier section adapted to receive switching signals and a current mirror circuit coupled with the outputs of the multiplier section for producing a single-ended output at an output terminal. The differential input signals are multiplied by the switching signals to produce an output signal at the output terminal of the phase detector the sense of which is determined by the phase relationship between the differential input signals and the switching signal. The phase detector includes a rectifier section having an input connected to the single-ended output of the differential amplifier section and a pair of outputs connected to the inputs of the multiplier section. Error current components produced in the amplifier section are substantially eliminated by the addition of the rectifier section and do not appear at the output of the phase detector.

15 Claims, 2 Drawing Figures

PHASE DETECTOR FOR TELEVISION TUNING SYSTEMS AND THE LIKE

BACKGROUND OF THE INVENTION

This invention relates to phase detectors and more particularly to an improved phase detector suitable for use in a television and other receiver systems.

Some contemporary television systems, for example, Secam television systems, utilize a gated phase detector in conjunction with the identification line burst and frame identification signals for proper synchronization. As will be explained, some contemporary gated phase detectors produce an output error current which can be comparable in magnitude with the desired output current unless strict tolerances of the circuit components are maintained. If the gated phase detector is fabricated in integrated circuit form the tight tolerances cannot be maintained in production.

For example, with reference to the aforementioned Secam identification scheme a gated phase detector circuit as shown in FIG. 1 herein must be gated on for periods encompassing the television line bursts and the frame identification signals. Due to system tolerances it has been found that the cumulative gating period will be two to three times the cumulative duration of the line bursts. Therefore, contemporary phase detector circuits comprising a differential amplifier and current mirror circuitry require bias currents of sufficient magnitude to handle noise signals of up to ten times the discriminator output supplied thereto during the television line bursts. Hence, the output error current, for instance, the error which is generated by the current mirror circuit will become comparable with the desired output current unless the current mirror be exceptionally precise. A three percent error in the currents generated by current mirror circuit tolerance has been found to generate an error output signal equal to the desired output level from the phase detector. Thus, there is a need for a phase detector which overcomes the foregoing problems without requiring precisely matched components or adjustments and which is suitable for fabrication in integrated circuit form.

In view of the above, it is one aspect of the present invention to provide an improved phase detector circuit for producing an output signal in response to input signals applied thereto having little or no error components without requiring precisely matched components.

Another aspect of the invention is to provide a phase detector circuit suitable for fabrication in integrated circuit form comprising an input differential amplifier, a multiplier section and a current mirror circuit for providing an output signal wherein error signals generated due to tolerances of components therein is reduced without requiring precise matching of the components.

SUMMARY OF THE INVENTION

In accordance with the foregoing and other aspects of the invention there is provided a phase detector wherein the differential input signal applied thereto is rectified before being multiplied in order to reduce error current components of the output current provided at the output thereof.

DESCRIPTION OF THE DRAWINGS

The specific embodiment for carrying out the present invention is described in detail below with reference to the drawings.

DETAILED DESCRIPTION OF THE SPECIFIC EMBODIMENT

Figure 1:
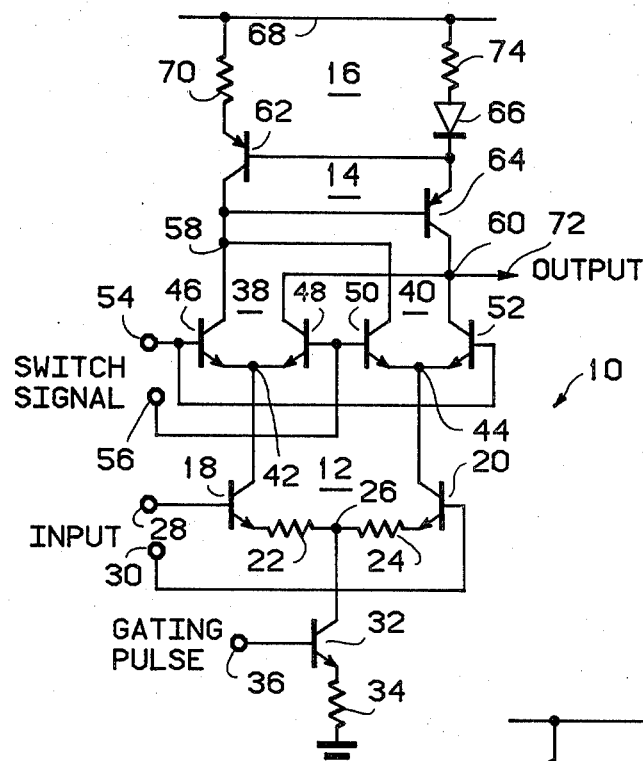
FIG. 1 is a schematic diagram of a gated phase detector utilized in contemporary tuning systems.

There is illustrated in FIG. 1 phase detector 10 which is generally well known in the art which comprises a differential input amplifier 12, multiplier section 14, and current mirror 16. Differential amplifier 12 includes NPN transistors 18 and 20 differentially connected at respective emitters via resistors 22 and 24 to a first common node 26. The bases of transistors 18 and 20 are coupled to input terminals 28 and 30 at which a differential input signal may be applied. The circuit bias current for the differential amplifier is controlled through transistor 32, the collector of which is connected to common node 26, the emitter is coupled via resistor 34 to a common ground reference. As illustrated, phase detector 10 is of the gated type and is rendered operative by a gating pulse applied to the base of transistor 32 at terminal 36. The collectors of transistors 18 and 20 are connected respectively to differential transistor pairs 38 and 40 at nodes 42 and 44. Differential transistor pairs 38 and 40 form multiplier section 14 of phase detector 10. Transistor pair 38 includes transistors 46 and 48 the emitters of which are differentially connected to terminal 42. Differential transistors pair 40 includes transistors 50 and 52 the emitters of which are differentially connected to terminal 44. The bases of transistors 46 and 52 are interconnected at a common node to a first switch terminal 54: the bases of transistors 48 and 50 are interconnected at a second common node to a second switch terminal 56. The collector of transistor 46 is interconnected with the collector of transistor 50 at common node 58. The collector of transistor 48 is interconnected at node 60 to the collector of transistor 52. Current mirror 16 provides a single ended output for the phase detector and includes PNP transistors 62 and 64 as well as diode 66. The collector-emitter path of transistor 62 is coupled between node 58 and a source of power supply provided to power supply conductor 68 via resistor 70. The collector of transistor 62 is also connected to the base of transistor 64 which has its collector-emitter path connected between output terminal 72 to the cathode of diode 66. The anode of diode 66 is coupled via resistor 74 to power supply conductor 68. Phase detector 10 may be fabricated in integrated circuit form with diode 66 being fabricated as a PNP transistor having its base connected to the collector thereof as is known.

The operation of phase detector 10 is well known in the art and is briefly described hereinafter. In general resistors 22 and 24 are well matched to bias differential amplifier input stage 12 in a linear operating range in response to the input signals applied thereto when gated on by transistor 32. Generally, the bias current through transistors 18 and 20, provided by transistor 32, is of sufficient magnitude to handle the maximum input signal levels which may be applied at terminals 28 and 30. Thus, in response to differential input signals applied at terminals 28 and 30 a differential current will flow in the collectors of transistors 18 and 20 which is then multiplied by the switching signal applied at terminals 54 and 56. The switching signal ideally alternates between a +1 and a −1 value to commutate the outputs of transistors 18 and 20 between output terminal 72 and current mirror 16. Thus, the output at output terminal 72 is ideally the differential current flow in transistors 18 and 20 multiplied by the switching signal.

Phase detector 10 will provide errors due to imperfections in current mirror 16, particularly due to any mismatch between resistors 70 and 74, as well as any difference in matching of transistors 62, 64 and diode 66. The average output current resulting will depend on the circuit bias current and the percentage of time that this bias current is gated on by gating pulses applied to terminal 36.

Although in many applications the percentage of error produced by current mirror 16 is not significant, in other applications these errors cannot be tolerated. For instance, if phase detector 10 is utilized in the chroma demodulator section of a Secam television receiver the errors contributed by current mirror 16 could prohibit the use of the detector therein. In a Secam television system the chroma information (B-Y and R-Y) is frequency modulated onto RF subcarriers of alternately 4.25 and 4.40625 megahertz. By use of a one line delay and a commutator the B-Y and R-Y signals are obtained sequentially and are utilized to produce hue control signals for each picture line. In order that the commutator switch in correct phase to have correct hue control, some means of identifying the frequency sequence must be provided. One manner may be to utilize a frequency discriminator tuned to a center frequency midway between the two subcarrier frequencies. The discriminator would then produce an output signal of alternating plus and minus sense that varies by a predetermined deviation from the center frequency during an identification portion of each picture line. These outputs could be compared with the phasing of the commutator switching signal to determine the correct sequence.

Phase detector 10 of FIG. 1 could be utilized as a phase detector to identify the correct phase of the identification burst occurring at a frequency of one or the other of the appropriate subcarrier frequency with the commutator switching signal appearing at terminals 54 and 56. The output of the discriminator would then be applied across input terminals 28 and 30. Thus, if the phase of the commutator switching signal and the discriminator output signal is correct, the output signal appearing at output terminal 72 would be of one polarity whereas if the phase between the commutator switching signal and the discriminator applied input signal is not correct the output signal at terminal 72 would be of another polarity. The output signal appearing at output terminal 72 then could be utilized to correct the phasing such that correspondence between the commutator switch signal and the discriminator output signal would be established. However, error currents may be generated in current mirror 16, as previously explained, to prevent the utilization of phase detector 10.

Figure 2:
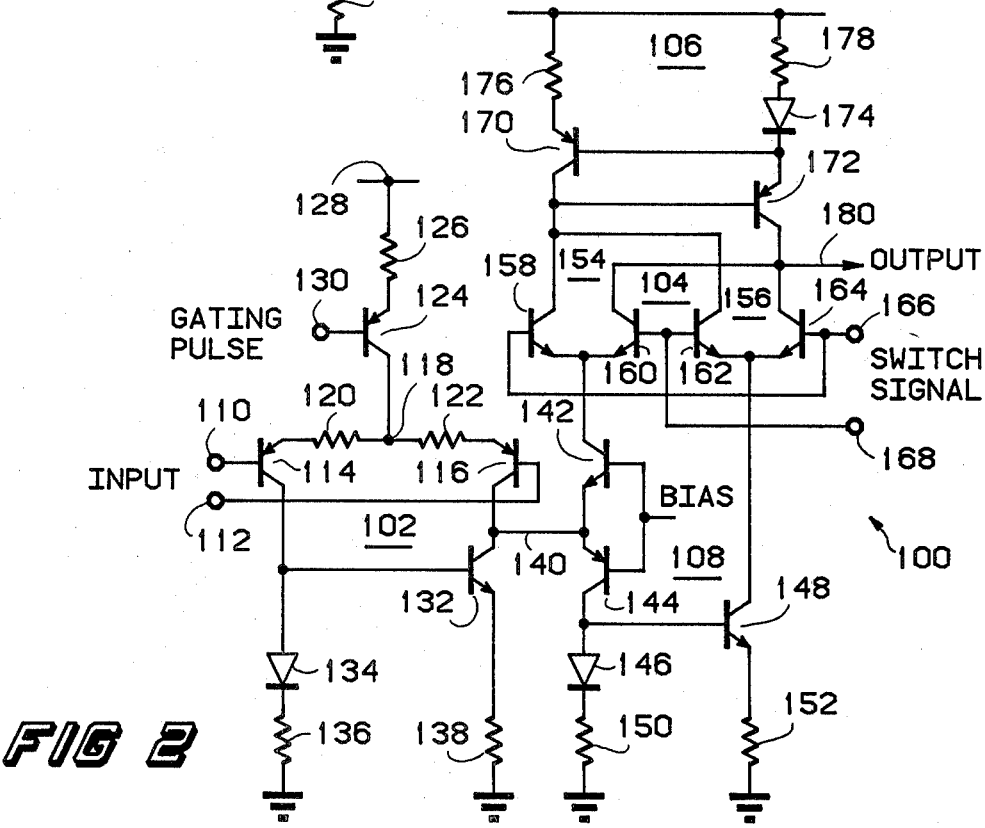
FIG. 2 is a schematic diagram of a gated phase detector of the preferred embodiment of the invention.

Turning to FIG. 2, there is provided a gated phase detector circuit 100 which overcomes the aforementioned problems associated with phase detector 10 and which can be utilized in one embodiment for identifying the frequency sequence from the output of the discriminator. Gated phase detector 100 is suitable to be fabricated in integrated circuit form and does not require precisely matched components to operate in a Secam television system, for example.

Phase detector 100 comprises a differential input amplifier 102, multiplier section 104, current mirror 106 and rectifier section 108. Differential input signals, which may be the output from the aforementioned frequency discriminator, are applied at input terminals 110 and 112 of differential section 102 to the bases of transistors 114 and 116 respectively. The emitter electrodes of transistors 114 and 116 are coupled to a common node 118 through resistors 120 and 122. Bias current for operating differential amplifier 102 is provided via transistor 124 and resistor 126 which is connected to a source of operating potential at node 128. Transistor 124 is gated on by gating pulses applied to the base thereof at terminal 130. Linear or differential inputs signals applied to terminals 110 and 112 are converted to a single ended output signal by a current mirror comprising transistor 132 and diode 134 and associated resistors. The anode of diode 134 is connected to the collector of transistor 114 and to the base of transistor 132. The cathode of diode 134 is coupled via resistor 136 to a terminal at which is supplied a reference potential. Similarly, the collector-to-emitter path of transistor 132 is connected between the collector of transistor 116 and said reference potential via resistor 138. The output of differential amplifier 102 is taken at the interconnected collectors of transistors 116 and 132 and supplied to rectifier section 108 via lead 140. Rectifier section 108 includes transistors 142 and 144 which are of opposite conductivity type and which are interconnected at the emitters thereof to lead 140. The base electrodes of transistors 142 and 144 are connected respectively at an interconnected node to a source of bias potential. The collector of transistor 142 serves as a first output of the rectifier section and the collector of transistor 144 is connected through a current mirror circuit comprising diode 146 and transistor 148. The current mirror circuit also includes resistors 150 and 152 for connecting the cathode of diode 146 and the emitter of transistor 148 to the source of reference potential. A second output of the rectifier section is taken at the collector of transistor 148. The two outputs of the rectifier section 108 are connected to the differential common nodes of transistor pairs 154 and 156 of multiplier section 104. Transistor pairs 154 and 156 comprise differentially connected transistors 158, 160 and 162, 164. Multiplier section 104 and current mirror 106 are identical to multiplier section 14 and current mirror 16 of FIG. 1 and serve the same function as aforedescribed. Switch signals are applied at terminals 166 and 168 for multiplying the signals appearing at the two outputs of rectifier section 108 in accordance with known techniques.

As will be explained, gated phase detector 100 severely reduces or eliminates the effects of error signals produced by current mirror circuit 16 of FIG. 1 such that the detector can be fabricated in integrated circuit form without the requirements of precisely matching components and can be utilized for detecting the phase correspondence between the switching signals applied at terminals 166 and 168 with the linear input signals applied at input terminals 110 and 112.

Although not limited thereto, the operation of phase detector 100 is described assuming that the linear input signals applied at terminals 110 and 112 are supplied from a frequency discriminator and alternate in their polarity at a frequency rate equal to the line frequency of a Secam television receiver for example. Hence, the discriminator signal is applied in a differential mode to input terminals 110 and 112; amplifier section 102 is made operational in response to the gating pulses applied at terminal 130. Emitter degeneration resistors 120 and 122 are chosen so that the amplifier remains in linear operation over the necessary input signal range as previously described. The collector current of transistor 114 is inverted by the current mirror comprising diode 134 and 132 and is subtracted from the collector current of transistor 116, as is known, to yield the amplifier output current over lead 140. The output current varies in its sense (depending on the differential input signals) and passes either via transistor 142 to switching transistors 158 and 160 of transistor pair 154 or via transistor 144 and the current mirror comprising diode 146 and 148 to switching transistors 162 and 164 of transistor pair 156. The collector electrodes of transistor 158 and 162 are interconnected to current mirror 106 such that the current flowing in either one of these collectors is inverted by current mirror 106 via transistor 170, 172, diode 174 and resistors 176 and 178 in the same manner aforedescribed. The collector current flowing in either transistor 160 or 164, which are interconnected at the output of transistor 72, is subtracted from the current appearing at the collector of transistor 172 which is the inverted collector currents of either transistor 158 or 162. In the present application the switching signals would be supplied by the commutator circuit and would be applied to terminal 166 and 168 at half the television line frequency as is understood.

Amplifier section 102 will in general produce an output error current, due to component tolerances as explained above with regard to phase detector 10 of FIG. 1. This error current however is of a constant sense and will add to the derived output current from amplifier section 102 appearing over lead 140. The output current from amplifier section 102, as previously explained, is of alternating sense. The resultant current may be of unique or alternating sense, according to the relative amplitudes of the two components. It may pass via transistor 142 to switching transistors 158 and 160 or via transistor 144 and the current mirror comprising diode 146 and transistor 148 to switching transistors 162 and 164, or it even may alternate between the two paths. The sense of this error component is however preserved in that it will always appear noninverted in the collector current of transistor 142 and inverted in the collector current of transistor 148. Therefore, for a given sense of the switching signal applied to multiplier section 104, the error component will appear in a defined sense at the output. For example, when transistor 158 and 164 are made to conduct by the switching signal, the error component, if passed via transistor 142, passes via transistor 158 and is inverted through current mirror 106 to be sourced at output terminal 180. However, if the error component is passed via transistor 148 it is already inverted such that if transistor 164 is conducting the error component would act to sink current at output 180. Likewise, when transistors 160 and 162 are made conductive by the polarity of the switching signal applied at terminals 166 and 168 the error component appears at output terminal 180 either inverted or non-inverted. Assuming that switching transistors 158, 162 and 160, 164 are alternately rendered conductive and non-conductive by the switching signal for equal periods, the average error current component flowing in the output will therefor be zero, subject only to the accuracy of the two current mirrors comprising diode 146, transistor 148 and current mirror 106. If these current mirrors are not precise, however, they cause only an error in the cancellation of the initial error current component, i.e., the resultant output is the product of two errors and will therefore be very very small.

From the above, the desired output current from amplifier section 102, like the error current, will be non-inverted if it appears at the collector of transistor 142 and inverted if it appears at the collector of transistor 148. The sense of the resultant output is therefore defined by the sense of the output current from amplifier section 106 and the sense of the switching signals applied at terminals 166 and 168 irrespective of whether the current was passed via transistor 142 or transistor 148. The desired output current from the amplifier is, however, one which inverses in phase synchronism with the switching signals. The final output is therefore of a constant sense according to the phase relationship between the alternating input signals applied to terminals 110 and 112 and the switching wave form. Thus, gated phase detector 100 is suitable for utilization in Secam television systems for identifying the correct frequency sequence of the identification burst signals which appear at the output of the frequency discriminator as alternating polarity signals.

Therefore, what has been described above is a gated phase detector having very little error current components which may be generated due to imprecise matching of components therein. The phase detector is useful for providing output signals having a defined polarity according to the phase relationship between the differential alternating input signals applied to the input of the phase detector and the switching signals applied to the multiplier section thereof.

I claim:

1. A phase detector including a differential amplifier section for amplifying applied input signals supplied thereto and having a single-ended output, a multiplier section which is adapted to receive alternating switching signals and a current mirror section coupled to outputs of the multiplier section for producing an output signal the sense of which is determined by the relationship between the applied input signals and the switching signals, the improvement comprising a rectifier section coupled between the output of the differential amplifier section and respective inputs of the multiplier section for causing the sense of any error current produced at the output of the amplifier section and applied to the multiplier section to be preserved thereby causing the substantial elimination of said error current components at the output of the phase detector while coupling the output of the differential amplifier to said respective inputs of the multiplier section.

2. The phase detector of claim 1 wherein said amplifier section includes a differential amplifier having differential inputs and differential outputs, the differential inputs being adapted to receive the differential input signals, and a current mirror circuit coupled with the differential outputs of the differential amplifier for providing a differential-to-single ended output.

3. The phase detector of claim 2 wherein said multiplier section includes two, two transistor pair differential amplifiers each having first and second transistors, said first and second transistors of said first transistor pair having the emitters thereof connected to a first common node and the first and second transistors of said second transistor pair having the emitters thereof connected to a second common node, the collector electrodes of the first transistors of said first and second transistor pair being interconnected at a third common node, the collector electrodes of said second transistors of respective first and second transistor pairs being interconnected to a fourth common node, the base electrodes of said first transistor of said first transistor pair and said second transistor of said second transistor pair being interconnected at a first terminal, the base electrodes of said second transistor of said first transistor pair and said first transistor of said second transistor pair being interconnected to a second terminals, said first and second terminal being adapted to receive said switching signal thereat.

4. The phase detector of claim 3 wherein said current mirror circuit includes first and second transistors of opposite conductivity type with respect to said first and second transistors of each of said transistor pairs, the collector electrode of said first transistor being coupled to the third common node, the emitter electrode being coupled to a terminal adapted to receive a source of operating potential, said base electrode being coupled to the emitter electrode of said second transistor, the base of said second transistor being connected to the collector of said first transistor and the collector of said second transistor being connected to said fourth common node to the output of the phase detector, and a diode being coupled between said terminal at which is supplied a source of operating potential and said emitter of said second transistor.

5. The phase detector of claim 4 wherein said rectifier section further includes an input coupled to said output of said amplifier section and first and second outputs coupled respectfully to said first and second common nodes of said multiplier section, including a first transistor of a first conductivity type, the base of which is connected to a node at which is supplied a bias potential, the emitter being coupled to said input and the collector being coupled to said first output; a second transistor of a second conductivity type having the base thereof coupled to said node at which is supplied said bias potential, the emitter being coupled to the input of said rectifier section; and a current mirror circuit connected between the collectors of said second transistor and the second output of said rectifier stage.

6. A phase detector suitable to be utilized in the chroma demodulator section of a television receiver comprising a multiplier section having first and second inputs and outputs respectively, a current mirror section coupled to said first and second outputs of said multiplier section for providing a single-ended output therefrom, said multiplier section being adapted to receive a switching signal at control terminals thereof; a differential amplifier section being adapted to receive a differential input signal at differential inputs thereof; and a rectifier section interposed between an output of said amplifier section and said first and second inputs of said multiplier section which preserves the sense of any error current components produced by said amplifier section that are then coupled to said multiplier section to substantially eliminate said error current components.

7. The phase detector of claim 6 wherein said differential amplifier section includes differential outputs, and a current mirror circuit coupled with the differential outputs of the differential amplifier for providing a differential-to-single ended output which is coupled to an input of said rectifier section.

8. The phase detector of claim 7 wherein said multiplier section includes two, two transistor pair differential amplifiers each having first and second transistors, said first and second transistors of said first transistor pair having the emitters thereof connected to said first input and the first and second transistors of said second transistor pair having the emitters thereof connected to said second input, the collectors of the first transistors of said first and second transistor pair being interconnected at said first output, and the collectors of said second transistors of respective first and second transistor pairs being interconnected to said second output, the bases of said first transistor of said first transistor pair and said second transistor of said second transistor pair being interconnected to a first control terminal, the bases of said second transistor of said first transistor pair and said first transistor of said second transistor pair being interconnected to a second control terminal, said first and second control terminals receiving said switching signal thereat.

9. The phase detector of claim 8 wherein said current mirror section includes first and second transistors of opposite conductivity type with respect to said first and second transistors of said transistor pairs, the collector of said first transistor being coupled to said first output of the multiplier section, the emitter being coupled to a terminal adapted to receive a source of operating potential, said base being coupled to the emitter of said second transistor, the base of said second transistor being connected to the collector of said first transistor and the collector of said second transistor being connected to said second output of the multiplier section to the output of the phase detector, and a diode coupled between said terminal at which is supplied a source of operating potential and said emitter of said second transistor.

10. The phase detector of claim 9 wherein said rectifier section includes an input connected to said output of said amplifier section and first and second outputs coupled respectfully to said first and second inputs of said multiplier section, including a first transistor of a first conductivity type the base electrode of which is connected to a node at which is supplied a bias potential, the emitter being coupled to said input and the collector being coupled to said first output; a second transistor of a second conductivity type, the base thereof being coupled to said node at which is supplied said bias potential, the emitter being coupled to the input of said rectifier section and a current mirror circuit connected between the collector of said second transistor and the second output of said rectifier section.

11. In a PAL/SECAM television receiver system having a chroma demodulator section including a frequency discriminator for producing output pulses the sense of which alternate in accordance with the particular television line sequence, a phase detector coupled with the frequency discriminator for identifying the line sequence, the phase detector including a differential amplifier input stage having differential inputs which are adapted for receiving the outputs from the frequency discriminator, a multiplier section having control input terminals adapted to receive switching signals at half the line sequence frequency and a current mirror circuit coupled to outputs of the multiplier section for providing an output signal the sense of which is determined by the phase relationship between the output signals from the frequency discriminator and the switching signals, the improvement comprising a rectifier section that is coupled between the output of the differential amplifier section of the phase detector and inputs of the multiplier section for preserving the sense of any error current components produced by the differential amplifier which are coupled to the multiplier section to substantially eliminate said error currents.

12. The phase detector of claim 11 wherein said amplifier section includes a differential amplifier having differential inputs and differential outputs, the differential inputs being adapted to receive the differential input signals, and a current mirror coupled with the differential outputs of the differential amplifier for providing a differential-to-single ended output.

13. The phase detector of claim 11 wherein said multiplier section includes two, two transistor pair differential amplifiers each having first and second transistors, said first and second transistors of said first transistor pair having the emitters thereof connected to a first input of the multiplier section and the first and second transistors of said second transistor pair having the emitters thereof connected to a second input of the multiplier section, the collectors of the first transistors of said first and second transistor pair being interconnected at a first common node which serves as a first output, and the collectors of said second transistors of respective first and second transistor pairs being interconnected to a second common node which serves as a second output, the bases of said first transistor of said first transistor pair and said second transistor of said second transistor pair being interconnected at a first one of the control input terminals, the bases of said second transistor of said first transistor pair and said first transistor of said second transistor pair being interconnected to a second one of the control input terminals.

14. The phase detector of claim 13 wherein said current mirror circuit includes first and second transistors of opposite conductivity type to said first and second transistors of said transistor pairs, the collector of said first transistor of said current mirror circuit being coupled to the first common node, the emitter being coupled to a terminal adapted to receive a source of operating potential, said base being coupled to the emitter of said second transistor of said current mirror circuit, the base of said second transistor of said current mirror circuit being connected to the collector of said first transistor of said current mirror circuit and the collector of said second transistor of said current mirror circuit being connected to said second common node to the output of the phase detector, and a diode being coupled between said terminal at which is supplied a source of operating potential and said said emitter of said second transistor of said current mirror circuit.

15. The phase detector of claim 14 wherein said rectifier section includes an input connected to said output of said differential amplifier and first and second outputs coupled respectively to said first and second inputs of said multiplier section, including a first transistor of a first conductivity type, the base of which is connected to a node at which is supplied a bias potential, the emitter being coupled to said input and the collector being coupled to said first output; a second transistor of a second conductivity type with a base electrode thereof being coupled to said node at which is supplied said bias potential, said emitter being coupled to the input of said rectifier section and a current mirror circuit connected between the collectors of said second transistor of said rectifier section and the second output of said rectifier section.

* * * * *